(12) United States Patent
Eichler et al.

(10) Patent No.: US 7,983,245 B2
(45) Date of Patent: Jul. 19, 2011

(54) METHODS AND SYSTEMS FOR CONVERTING AN INTERNET PROTOCOL (IP)-BASED MESSAGE CONTAINING SUBSCRIBER CONTENT TO A PUBLIC SWITCHED TELEPHONE NETWORK (PSTN)-BASED MESSAGE INCLUDING SUBSCRIBER CONTENT

(75) Inventors: Todd Anthony Eichler, Wake Forest, NC (US); Robert John Delaney, Raleigh, NC (US)

(73) Assignee: Tekelec, Morrisville, NC (US)

( * ) Notice: Subject to any disclaimer, the term of this patent is extended or adjusted under 35 U.S.C. 154(b) by 1429 days.

(21) Appl. No.: 10/957,852

(22) Filed: Oct. 4, 2004

(65) Prior Publication Data
US 2006/0056419 A1    Mar. 16, 2006

Related U.S. Application Data

(60) Provisional application No. 60/609,488, filed on Sep. 13, 2004.

(51) Int. Cl.
*H04L 12/66* (2006.01)

(52) U.S. Cl. ............. 370/352; 379/221.08; 379/229

(58) Field of Classification Search ............ 307/395.21, 307/395.5, 466, 467; 370/395.21, 395.5, 370/466, 467, 395.52, 352–356, 401, 410; 379/221.08, 221.13, 229, 230
See application file for complete search history.

(56) References Cited

U.S. PATENT DOCUMENTS

| | | | |
|---|---|---|---|
| 6,438,223 B1 | 8/2002 | Eskafi et al. | |
| 6,453,034 B1 * | 9/2002 | Donovan et al. | 379/220.01 |
| 6,636,596 B1 | 10/2003 | Gallant et al. | |
| 6,735,209 B1 | 5/2004 | Cannon et al. | |
| 6,757,732 B1 | 6/2004 | Sollee et al. | |
| 6,931,007 B2 * | 8/2005 | Jones | 370/392 |
| 6,952,575 B1 * | 10/2005 | Countryman et al. | 455/408 |
| 6,977,993 B2 * | 12/2005 | Starbuck et al. | 379/88.21 |
| 7,366,183 B1 * | 4/2008 | Sylvain | 370/395.61 |
| 7,486,781 B2 * | 2/2009 | Newman et al. | 379/88.18 |
| 7,684,553 B2 * | 3/2010 | Wallenius et al. | 379/219 |
| 7,756,979 B1 * | 7/2010 | Staack et al. | 709/227 |
| 2002/0057786 A1 * | 5/2002 | Donovan et al. | 379/220.01 |
| 2002/0077134 A1 * | 6/2002 | Mizell et al. | 455/466 |
| 2002/0136370 A1 * | 9/2002 | Gallant | 379/90.01 |
| 2003/0026289 A1 | 2/2003 | Mukherjee et al. | |

(Continued)

OTHER PUBLICATIONS

Notification of Transmittal of the International Search Report and the Written Opinion of the International Searching Authority, or the Declaration for International Application No. PCT/US05/32549 (Apr. 19, 2006).

(Continued)

*Primary Examiner* — Simon Sing
*Assistant Examiner* — Akelaw A Teshale
(74) *Attorney, Agent, or Firm* — Jenkins, Wilson, Taylor & Hunt, P.A.

(57) ABSTRACT

A node in a converged network converts a session initiation protocol (SIP) message to a signaling system 7 (SS7) message. A SIP INVITE request is received by the node and the node determines whether the SIP INVITE request is destined for an SS7 user. If the INVITE request is destined for an SS7 user, the node determines whether the INVITE request contains MIME-encoded text and constructs a short message service (SMS) message containing the MIME-encoded text. The SMS message is routed to the SS7 user. In addition, the node constructs an initial address message (IAM) and routes the IAM to the SS7 user.

15 Claims, 6 Drawing Sheets

U.S. PATENT DOCUMENTS

| | | | | |
|---|---|---|---|---|
| 2003/0076815 A1* | 4/2003 | Miller et al. | | 370/352 |
| 2003/0137991 A1* | 7/2003 | Doshi et al. | | 370/466 |
| 2004/0062375 A1* | 4/2004 | Wang et al. | | 379/219 |
| 2004/0151194 A1 | 8/2004 | Cannon et al. | | |
| 2004/0156394 A1 | 8/2004 | Westman | | |
| 2004/0199649 A1* | 10/2004 | Tarnanen et al. | | 709/230 |
| 2004/0209640 A1* | 10/2004 | Urban et al. | | 455/550.1 |
| 2004/0264470 A1* | 12/2004 | Sirbu | | 370/395.2 |

OTHER PUBLICATIONS

Rosenberg et al., "SIP: Session Initiation Protocol," RFC 3261, pp. 1-252 (Jun. 2002).

Tekelec, "Eagle® Feature Guide," PN/9110-1225-01, (Jan. 1998).

Supplemental European Search Report for European application No. 05796072.6 (May 26, 2010).

Vemuri et al., "SIP for Telephones (SIP-T): Context and Architectures," Network Working Group, draft-ietf-sipping-sipt-04 (Jun. 2002).

Camarillo et al., "ISUP to SIP Mapping," Internet Engineering Task Force, draft-ietf-sip-isup-03.txt (Aug. 2001).

Donovan, "The SIP INFO Method," Internet Draft, draft-ietf-sip-info-method-04.txt (Jan. 2001).

Sinnreich et al., "Internet Communications Using SIP: Delivering VoIP and Multimedia Services With Session Initiation Protocol," Wiley Computer Publishing, pp. 50-85 (Jan. 1, 2001).

* cited by examiner

METHODS AND SYSTEMS FOR CONVERTING AN INTERNET PROTOCOL (IP)-BASED MESSAGE CONTAINING SUBSCRIBER CONTENT TO A PUBLIC SWITCHED TELEPHONE NETWORK (PSTN)-BASED MESSAGE INCLUDING SUBSCRIBER CONTENT

RELATED APPLICATIONS

This application claims the benefit of U.S. Provisional Patent Application Ser. No. 60/609,488, filed Sep. 13, 2004; the disclosure of which is incorporated herein by reference in its entirety.

TECHNICAL FIELD

The present invention generally relates to methods and systems for converting Session Initiation Protocol (SIP)-based messages containing MIME-encoded text messages into signaling system number 7 (SS7)-based short message service (SMS) messages. More particularly, the present invention relates to methods and systems for converting SIP INVITE requests containing MIME-encoded text messages to SS7 SMS messages and SS7 ISDN User Part (ISUP) messages.

BACKGROUND ART

Instant messaging (IM) services have existed in Internet protocol (IP) networks for some time. Instant messaging is generally defined as the exchange of content, usually short text messages, between a set of participants in near real time. IM clients have evolved to include presence applications, which determine when a predetermined list of users are actively connected to the IP network and are available to participate in an IM session. The Session Initiation Protocol (SIP) is used to set up multi-media sessions between SIP users. For example, the sessions may be voice telephone calls between SIP-capable telephones. SIP has also been extended to support the transfer of instant messages.

SIP uses an INVITE request to initiate a media session between two or more users. One feature of the INVITE request is that it can contain MIME-encoded text, so some instant messaging clients may use an INVITE request to deliver instant messaging text while establishing a media stream between users. Another method for delivering instant messages in the SIP environment is a MESSAGE request. The main difference between an INVITE request containing text and the MESSAGE request is the MESSAGE request does not establish a SIP dialog session.

Figure 1:
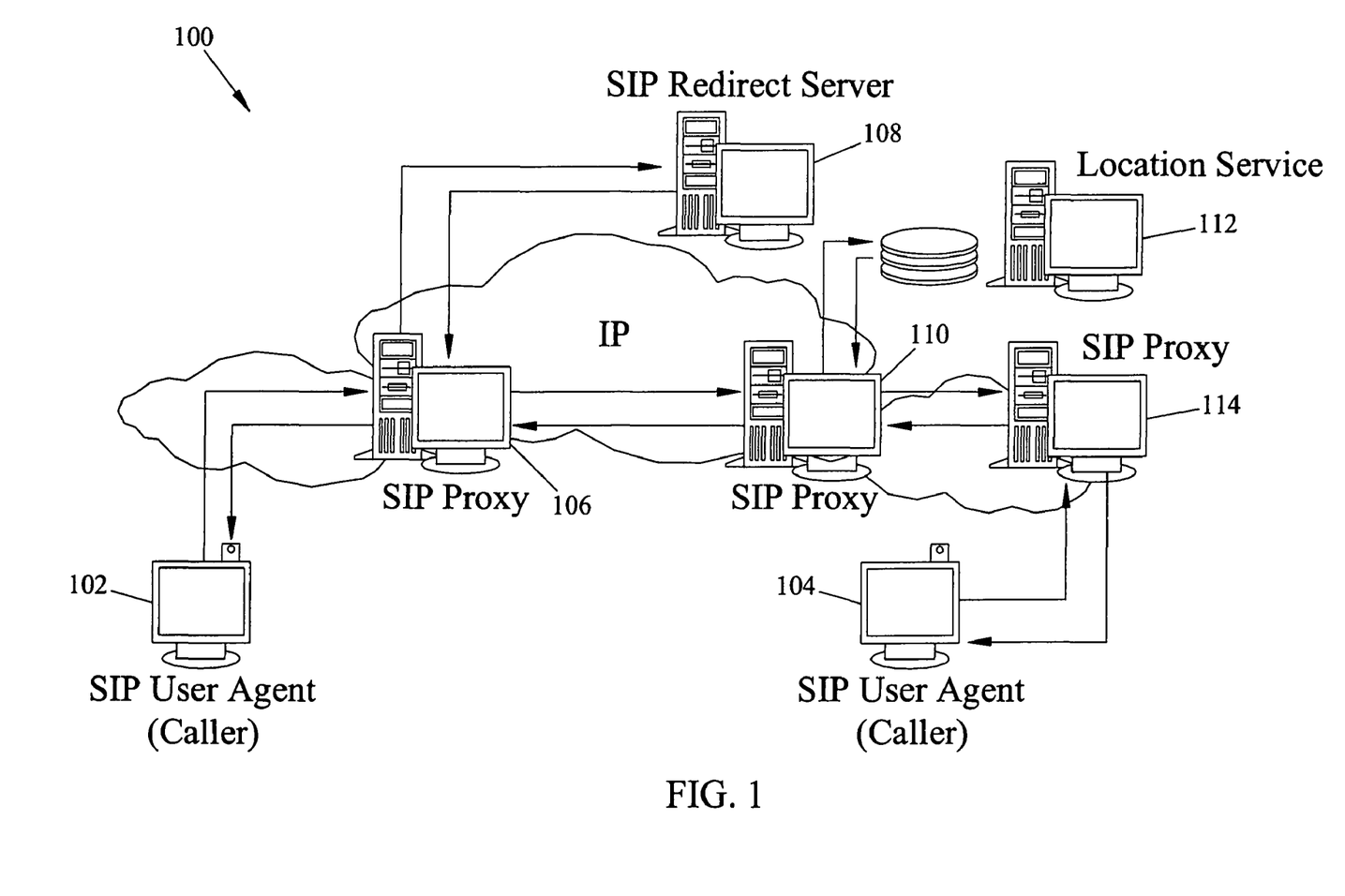
FIG. 1 is a network diagram illustrating a typical SIP network deployment.

FIG. 1 depicts a typical SIP network deployment. In this example, user agent 102 wishes to establish a call with user agent 104. To establish the call, user agent 102 sends an INVITE request addressed to user agent 104. While user agent 102 knows the uniform resource identifier (URI) and the SIP identity for user agent 104, it is likely that user agent 102 does not know the specific location or the address of the SIP server that serves user agent 104. To determine the address of the SIP server, user agent 102 transmits the INVITE request to a local proxy server 106. The proxy server 106 receives SIP requests and forwards them on behalf of the requester. In this example, the proxy server 106 receives the INVITE request and sends a response back to user agent 102 indicating that the proxy server 106 is attempting to deliver the message. Proxy server 106 may determine the address of the proxy server associated with user agent 104 by various means, including performing a domain name service (DNS) lookup or sending a request to a redirect server 108. Once the address of the destination proxy server 110 is obtained, proxy server 106 forwards the INVITE request to proxy server 110 for delivery to user agent 104. Once proxy server 110 receives the INVITE request, proxy server 110 consults a location service database 112 that contains the current IP address of user agent 104. Proxy server 110 may deliver the INVITE request directly to user agent 104 or may use an intermediate proxy server 114, depending on network topology.

As noted above, the INVITE request may include MIME-encoded text. For example, user agent 102 may wish to include a short text message stating the purpose of the call so that user agent 104 can decide whether to answer the call or not. On SIP-enabled phones, the text portion of the INVITE request may be displayed by the phone when the user is notified of an incoming call.

It should be appreciated that FIG. 1 depicts a network configuration where both the originating user agent and the destination user agent are located on IP-based networks. However, it is important for IP-based networks to interoperate with traditional PSTN networks to enable voice communication between users of each network. Thus, the SIP protocol, which is used to establish a media session between user agents in an IP network, must interoperate with the SS7 ISUP protocol, which is used for call processing in a PSTN network. While SIP permits the transmission of text while establishing a voice connection, SS7 does not support this feature.

Accordingly, there is a need to provide a system and method for converting an INVITE request containing MIME-encoded text into corresponding SS7 messages, thereby preserving the MIME-encoded text portion and establishing an end-to-end connection.

DISCLOSURE OF THE INVENTION

In accordance with the present invention, a method of converting a session initiation protocol (SIP) message to a signaling system 7 (SS7) message is provided. A SIP INVITE request is received by a node in a converged network and the node determines whether the SIP INVITE request is destined for an SS7 user. If the INVITE request is destined for an SS7 user, the node determines whether the INVITE request contains MIME-encoded text and constructs a short message service (SMS) message containing the MIME-encoded text. The SMS message is routed to the SS7 user. In addition, the node constructs an initial address message (IAM) and routes the IAM to the SS7 user.

Accordingly, it is an object of the invention to provide a similar level of messaging service to SIP and non-SIP users.

It is another object of the invention to translate text and non-text portions of a SIP INVITE request into corresponding SS7 protocol messages.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

The present invention includes methods and systems for converting SIP-based INVITE requests and SIP-based MESSAGE requests containing MIME-encoded text messages into SS7-based SMS and ISUP messages. In one implementation, the MIME-encoded text portion of the INVITE request is used to generate an SS7 SMS message and an SS7 initial address message (IAM) is generated to establish the voice portion of the call.

Figure 2:
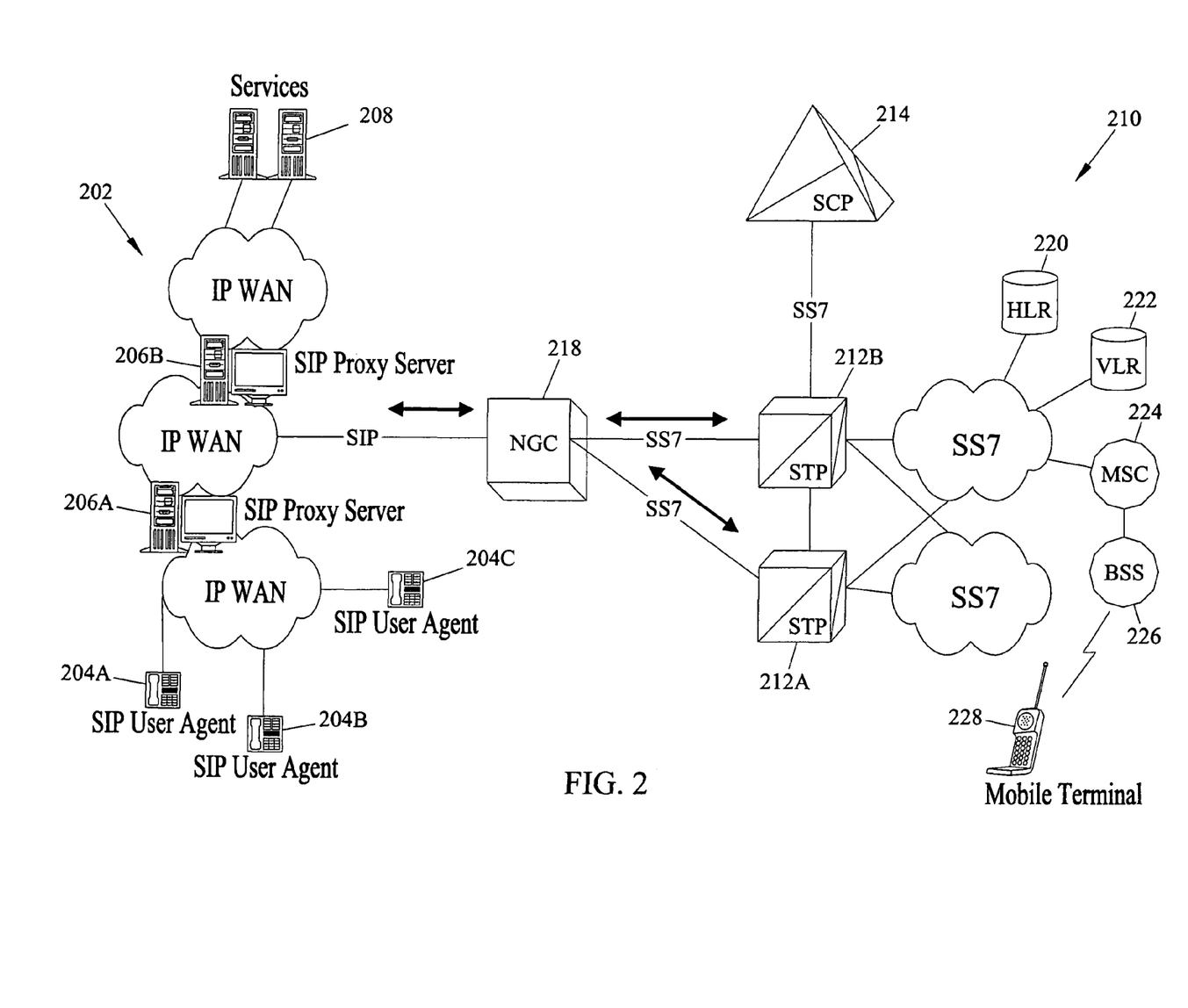
FIG. 2 is a network diagram illustrating a hybrid SIP/SS7 network that permits the conversion and delivery of SIP INVITE requests to subscribers on the SS7 network according to an embodiment of the present invention.

FIG. 2 depicts a hybrid SIP/SS7 network that permits the conversion and delivery of SIP INVITE requests to subscribers on the SS7 network. It should be appreciated that telephones operating on the SS7 network that are capable of displaying MIME-encoded text messages are currently limited to mobile subscribers. Accordingly, while this embodiment of the invention may be described in terms of a PSTN mobile subscriber, the invention should not be so limited.

Returning to FIG. 2, the SIP portion 202 of the hybrid SIP/SS7 network may include multiple SIP user agents (204A, 204B, 204C), multiple SIP proxy servers (206A, 206B), and one or more additional servers 208 to provide other services, such as DNS lookup and location services. The function of each of these components is described in greater detail above with respect to FIG. 1.

The SS7 portion 210 of the hybrid SIP/SS7 network may include one or more signal transfer points (STP) 212A, 212B, for routing SS7 messages to various nodes in the network. The SS7 network may include service control points (SCP) 214, which provide database functions to the network. The database functions may include a home location register (HLR) 220 and a visitor location register (VLR) 222, which provide routing information for mobile terminals in a wireless network. Messages destined for a mobile terminal may be routed through a mobile switching center (MSC) 224, which forwards the message to the appropriate base station system (BSS) 226 for transmission to the mobile terminal MT 228.

A network gateway controller (NGC) 218 provides the interface between the SIP portion 202 of the network and the SS7 portion 210 of the network. In accordance with one aspect of the invention, the NGC 218 may receive from the SIP portion of the network an INVITE request that contains MIME-encoded text. The NGC 218 may deconstruct the INVITE request and generate an SS7 SMS message containing the MIME-encoded text portion of the INVITE request and an SS7 IAM message to establish the voice session between user agents.

Figure 3:
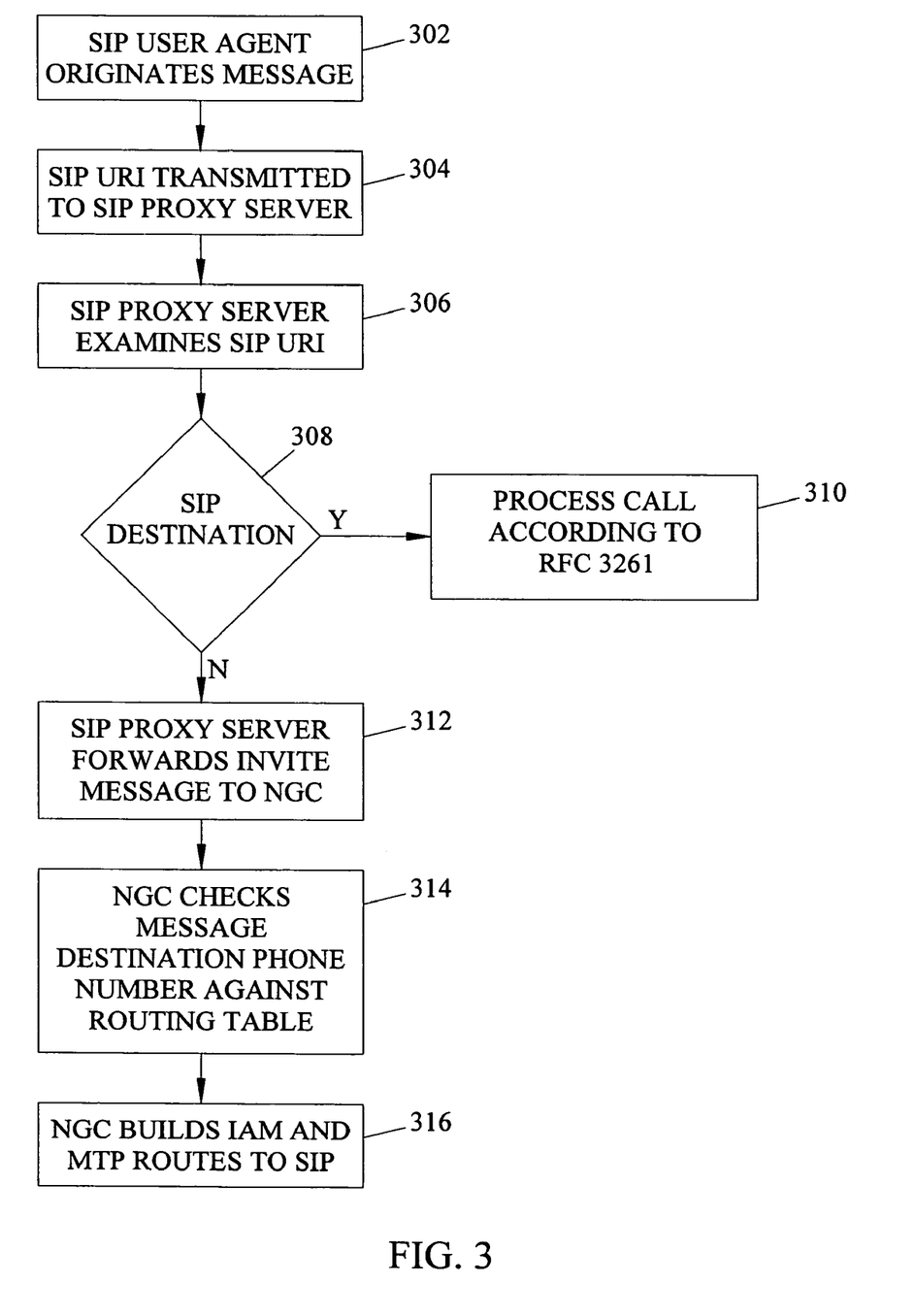
FIG. 3 is a flow diagram illustrating exemplary steps taken by various network components to deliver a message from a SIP user agent to a PSTN subscriber according to an embodiment of the present invention.

FIG. 3 is an exemplary flow diagram generally showing the steps taken by various network nodes to deliver a message from a SIP user agent 204 to an SS7 user agent 216. In step 302, the SIP user agent originates an INVITE request destined for the call recipient. This may be accomplished by creating an INVITE request addressed to, in this case, SS7 user agent 216. A call between a SIP user agent and a non-SIP user agent is referred to as an off-net call. However, the SIP user agent that originates the message is not concerned with whether the message is destined for an on-net or off-net recipient. Rather, the SIP user agent 204A creates an INVITE request addressed to recipient user agent 216 and forwards the INVITE request to a SIP proxy server 206A (step 304).

In step 306, the SIP proxy server 206A examines the SIP URI of the INVITE request and, in step 308, determines whether the destination is an on-net or off-net user agent, for example, by comparing the destination domain or IP address to values stored in a routing table. If the SIP proxy server 206A determines that the designated recipient is a SIP user agent, the call is processed in a conventional manner, for example according to RFC 3261 (step 310). If the destination of the INVITE request is not a SIP user agent, the SIP proxy server forwards the INVITE request to the NGC 218 for further processing (step 312).

In step 314, the NGC 218 examines the received INVITE request and extracts the destination phone number. The NGC 218 may compare the destination phone number against an internal routing table or it may query other SS7 network components to determine how to route the call. Once the routing information is obtained, the NGC 218 examines the received INVITE request to determine if it contains MIME-encoded text. If the message contains MIME-encoded text, the NGC 218 builds an SMS message and MTP routes the SMS message to the appropriate STP 212A or 212B for delivery to the destination user agent 216. In addition, the NGC 218 builds an SS7 IAM message and MTP routes the message to the appropriate STP 212A or 212B for delivery to the SS7 user agent 216. The SMS message delivers the text portion of the SIP INVITE request while the SS7 IAM message initiates an ISUP dialogue between switching offices that establishes a bi-directional media connection or voice phone call.

As noted above, the NGC 218 builds an SMS message based on information in the SIP INVITE request. Table 1 contains several SIP message parameters that may be used by the NGC 218 to create an SMS-compatible message using the SS7 protocol stack.

TABLE 1

| SIP Message Parameters | |
|---|---|
| Parameter | Description |
| To | contains a display name and a SIP URI toward which the request was originally directed |
| From | contains a display name and a SIP URI that indicates the originator of the request |
| Call ID | contains a globally unique identifier for the call |
| CSeq | (command sequence) contains an integer and a method name |
| Content-type | contains a description of the message body |
| Content-length | contains a byte count of the message body |
| Content-disposition | describes how the message body is to be interpreted |
| Content | message body |

It should be appreciated that SIP messages may carry MIME content that is not compatible with SMS. For example, a SIP message may include a session description protocol (SDP) structure in the message body. The SDP may include media information such as RTP payload type, addresses, and ports. Therefore, an INVITE request may include a piece of text, an image, etc. In one embodiment of the invention, the content of the SIP message must be compatible with SMS. In alternate embodiments, NGC 218 may extract other types of subscriber content, such as multimedia content, from the SIP message and formulate the appropriate multimedia messaging service (MMS) message for delivery to the PSTN subscriber. For an SMS-only implementation, the content type must be text, the content length cannot be greater than the number of characters supported by SMS, and the content disposition must be set to render. As described in RFC 3261, the content disposition field describes how the message body is to be interpreted by the user agent client or user agent server. By setting the content disposition field to render, the user agent is instructed that the message body should be displayed or otherwise rendered to the user.

As discussed above, the NGC 218 acts as a gateway between the IP portion of the network and the SS7 portion of the network. In one implementation, a signaling gateway (SG) 400 may be used to perform this function.

Figure 4:
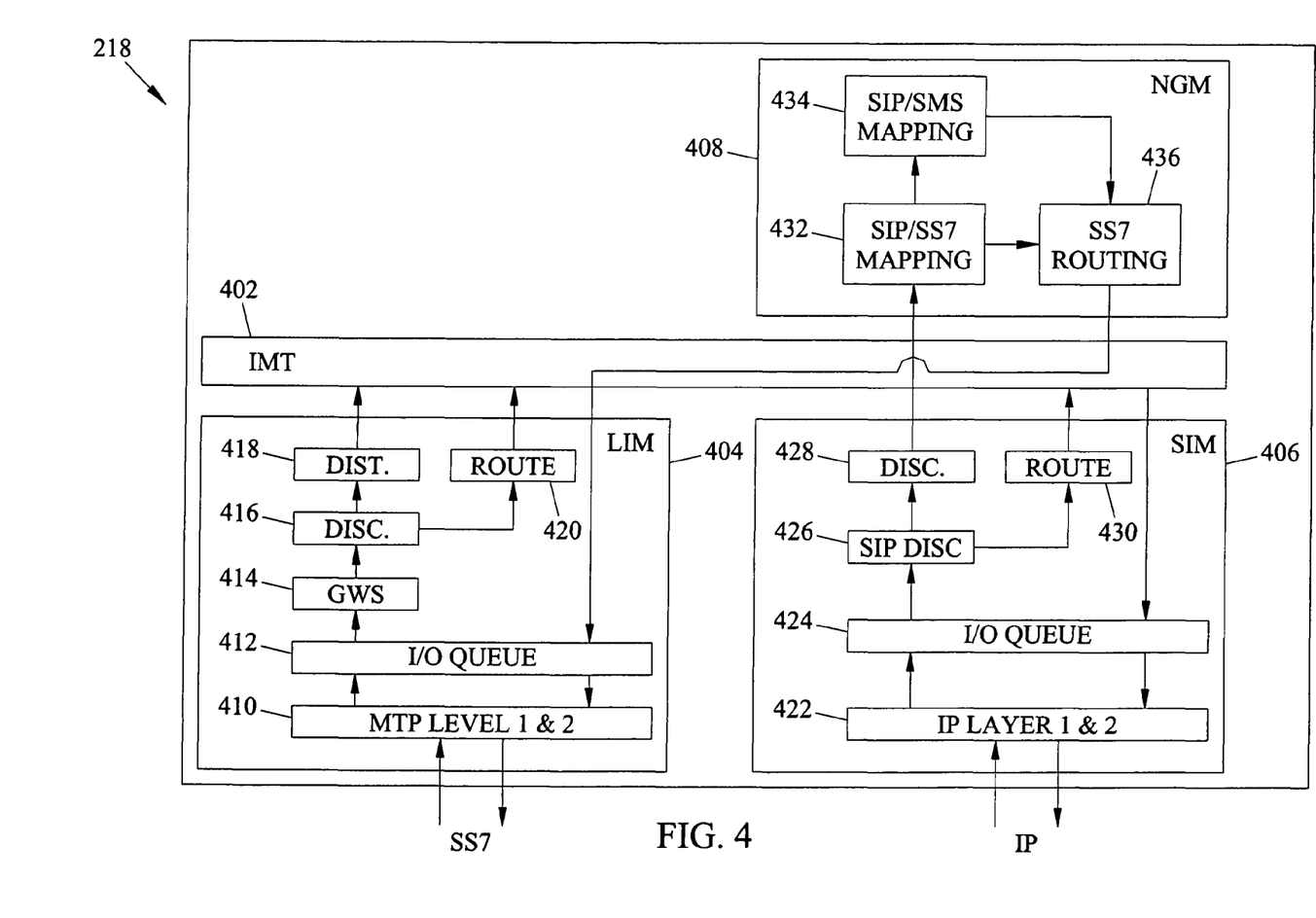
FIG. 4 is a block diagram illustrating an exemplary internal architecture of a signaling gateway that may be used to translate SIP INVITE requests into SS7 SMS and IAM messages according to an embodiment of the present invention.

FIG. 4 is a block diagram illustrating an exemplary internal architecture of NGC 218 that may be used to translate SIP INVITE requests into SS7 SMS and IAM messages according to an embodiment of the present invention. NGC 218 may include SS7 signal transfer point (STP) functionality for processing SS7 messages and IP functionality for processing IP messages. In a particular embodiment, NGC 218 may be implemented on an Eagle® SS7/IP gateway platform available from Tekelec of Calabasas, Calif. The Eagles platform may be modified to include the SIP to SMS and ISUP conversion functionality, as will be described in detail below.

In the illustrated embodiment, NGC 218 includes an inter-processor message transport (IMT) bus 402, which provides a reliable transport mechanism for transporting messages between modules in NGC 218. IMT bus 402 may include a dual counter-rotating bus so that traffic may be re-routed in response to a module failure. A number of cards or processing modules may be coupled to IMT bus 402. These cards or processing modules may include an SS7-capable link interface module (LIM) 404, an IP-capable SIP interface module (SIM) 406, and a network gateway module (NGM) 408. Each of the modules may be physically connected to IMT bus 402 such that signaling and other messages may be routed internally between all active cards or modules.

As used herein the term "module" may include a hardware component, a software component, a firmware component or any combination thereof. For example, a module may be a chip, such as an ASIC, designed to perform a specific function. Alternatively, a module may be a part of a computer program that performs a specific function or a module may be a microprocessor programmed to perform a specific function.

In one implementation, each module includes a printed circuit board having an application processor and a communications processor mounted thereon. The application processor on each module may be programmed to perform a telecommunications processing function. For example, the application processor on network gateway module 408 may be configured to translate signaling messages between SIP and SS7. The communications processor on each module may be programmed to perform link-level communications with other modules via IMT bus 402.

For simplicity of illustration, only single LIM, SIM, and NGM cards are included in FIG. 4. However, it should be appreciated that the distributed, multi-processor architecture of the NGC 218 facilitates the deployment of multiple LIM, SIM, NGM and other cards, all of which may be simultaneously connected to and communicating via IMT bus 402.

Focusing now on the functions of LIM card 404, in the illustrated embodiment, LIM 404 includes a number of sub-components including an SS7 MTP level 1 and 2 process 410, an I/O buffer or queue 412, a gateway screening (GWS) process 414, an SS7 MTP level 3 discrimination process 416, a distribution process 418, and a routing process 420. MTP level 1 and 2 process 410 provides the facilities necessary to send and receive digital data over a particular physical medium. MTP level 1 and 2 process 410 also performs error detection, error correction and sequenced delivery of SS7 message packets from the SS7 network. I/O queue 412 provides for temporary buffering of incoming and outgoing signaling message packets. GWS process 414 examines received message packets and determines whether the messages should be allowed into NGC 218 for processing and/or routing. Gateway screening may include examining the destination point code of the received MSU to determine whether the MSU is to be allowed into a network for which NGC 218 routes messages.

Discrimination process 416 performs a discrimination function, effectively determining whether an incoming SS7 message packet requires internal processing or is simply to be through-switched, i.e., routed to another node. This determination may be made by examining a destination point code in the message. If the destination point code is set to the point code of routing NGC 218, discrimination process 416 may determine that the message requires internal processing. If the destination point code is not set to the point code of NGC 218, discrimination process 416 may determine that the message is required to be through-switched.

In addition to examining the destination point code in a received message, discrimination process 416 may also examine the service indicator in a message to determine whether the message is an SCCP message. If the destination point code in the message is set to the point code of NGC 218 and the service indicator indicates that the message is an SCCP message, discrimination process 416 may forward the message to distribution process 418. Distribution process 418 handles the internal routing of SS7 message packets that require additional processing prior to final routing. If discrimination process 416 determines that a message should be through switched, discrimination process 416 forwards the message to routing process 420. Routing process 420 routes signaling messages to the appropriate outbound signaling links based on destination point codes in the messages.

SIP interface module (SIM) 406 transmits and receives SIP formatted messages to and from the IP network. In the illustrated embodiment, SIM 406 includes an IP layer process 422, an I/O queue 424, a SIP discrimination module 426, a distribution process 428, and a routing process 430. IP layer process 422 receives IP packets from the IP network, performs error checking, and forwards the packet payload to the I/O queue 424. I/O queue 424 provides for temporary buffering of incoming and outgoing SIP messages.

SIP discrimination process 426 receives messages from the I/O queue 424. The SIP discrimination process 426 determines whether the incoming packet is destined for a user on a SIP network or a PSTN network. Messages destined for a PSTN user are forwarded to the distribution process 428, while messages destined for a SIP user are forwarded to the routing process 430. Messages received by the routing process 430 are transferred via the IMT 402 to another SIM module for delivery to another part of the SIP network. Messages received by the distribution process 428 are forwarded to the network gateway module 408 for further processing.

On the NGM 408, the SIP/SS7 mapping process 432 receives SIP messages from the distribution process 428 on the SIM 406. The SIP/SS7 mapping process 432 determines the type of SS7 message that corresponds to the received SIP message and builds the SS7 message by mapping SIP parameters to SS7 parameters. For example, if the SIP message is an INVITE request, SIP/SS7 mapping process 432 may build an SS7 IAM message. The SIP/SS7 mapping process 432 may examine the SIP parameters to determine if the SIP message contains MIME-encoded text. This may be accomplished by examining one or more of the content-type, content-length, content-disposition, or content portions of the SIP message. If the SIP/SS7 mapping process 432 determines that the SIP message includes text, the message is forwarded to the SIP/SMS mapping process 434. The SS7 message that was built by the SIP/SS7 mapping process 432 is forwarded to the SS7 routing process 436. It should be appreciated that some SIP messages may not require an SS7 ISUP message. For example, a SIP MESSAGE request may be processed by SIP/SMS mapping process 436 without SIP/SS7 mapping process 432 generating an SS7 ISUP message. For SIP MESSAGE requests, SIP/SMS mapping process 434 may convert these messages into the appropriate SMS messages, such as forward-short-message messages. It should also be appreciated that some SIP messages may require mapping to other SS7 protocol message types, such as Transaction Capabilities Application Part (TCAP). Accordingly, SIP/SS7 mapping process 432 may provide the capability to generate other SS7 protocol messages.

SIP/SMS mapping process 434 receives the SIP message from the SIP/SS7 mapping process 432. The SIP/SMS mapping process 434 analyzes the content parameters to determine whether the message content is compatible with SMS. For example, for SMS translation the content-type must be text, the content-length cannot be greater than the number of characters supported by SMS, and the content-disposition must be set to render. For multimedia messaging service (MMS), SIP/SMS mapping process 434 may create an appropriate MMS message including the multimedia content. If the content of the SIP message is compatible with SMS, the SIP/SMS mapping process 434 builds a SMS message by mapping parameters of the SIP message to corresponding SS7 parameters, as shown in Table 2.

TABLE 2

SIP Parameters Mapped to SS7 SMS Parameters

| SS7 Parameter | SIP Parameter | Notes |
|---|---|---|
| DPC | | Generated based on Phone Number |
| OPC | | Point Code of NGC |
| Calling Party Point Code | | Point Code of NGC |
| Calling Party Address | From | |
| Called Party Point Code | | Generated based on Phone Number (SSP serving called party) |
| Called Party Address | To | |
| Sm-RP-DA | To | Used to identify the destination IMSI.MIN of the SMS |
| Sm-RP-OA | | Used to identify the destination |

TABLE 2-continued

SIP Parameters Mapped to SS7 SMS Parameters

| SS7 Parameter | SIP Parameter | Notes |
|---|---|---|
| Sm-RP-UI SMS Data | Content | IMSI-MIN of the SMS The SMS content |
| Sm-RP-UI Originator Address | From | The originating address IMISI/MSISN/MIN |

It should be appreciated that not all of the SS7 SMS parameters can be determined directly from the parameters of the SIP message. Once the SIP/SMS mapping process 434 has built the SMS message as completely as possible based on the SIP parameters, the SMS message is forwarded to the SS7 routing process 436.

SS7 routing process 436 receives the SS7 message from SIP/SS7 mapping process 432 and the SMS message from SIP/SMS mapping process 434. The SS7 routing process 436 may perform lookups for various network databases to determine information necessary to route the SS7 message and the SMS message. For example, the SS7 routing process 436 may query a home location register (HLR) to obtain subscriber information for the destination user. Once the SS7 routing process 436 obtains the necessary routing information, the SMS message and SS7 message are routed to the appropriate line interface module for delivery to the PSTN network. For example, the SMS message may be routed to the final servicing MSC for delivery to a wireless customer.

Figure 5:
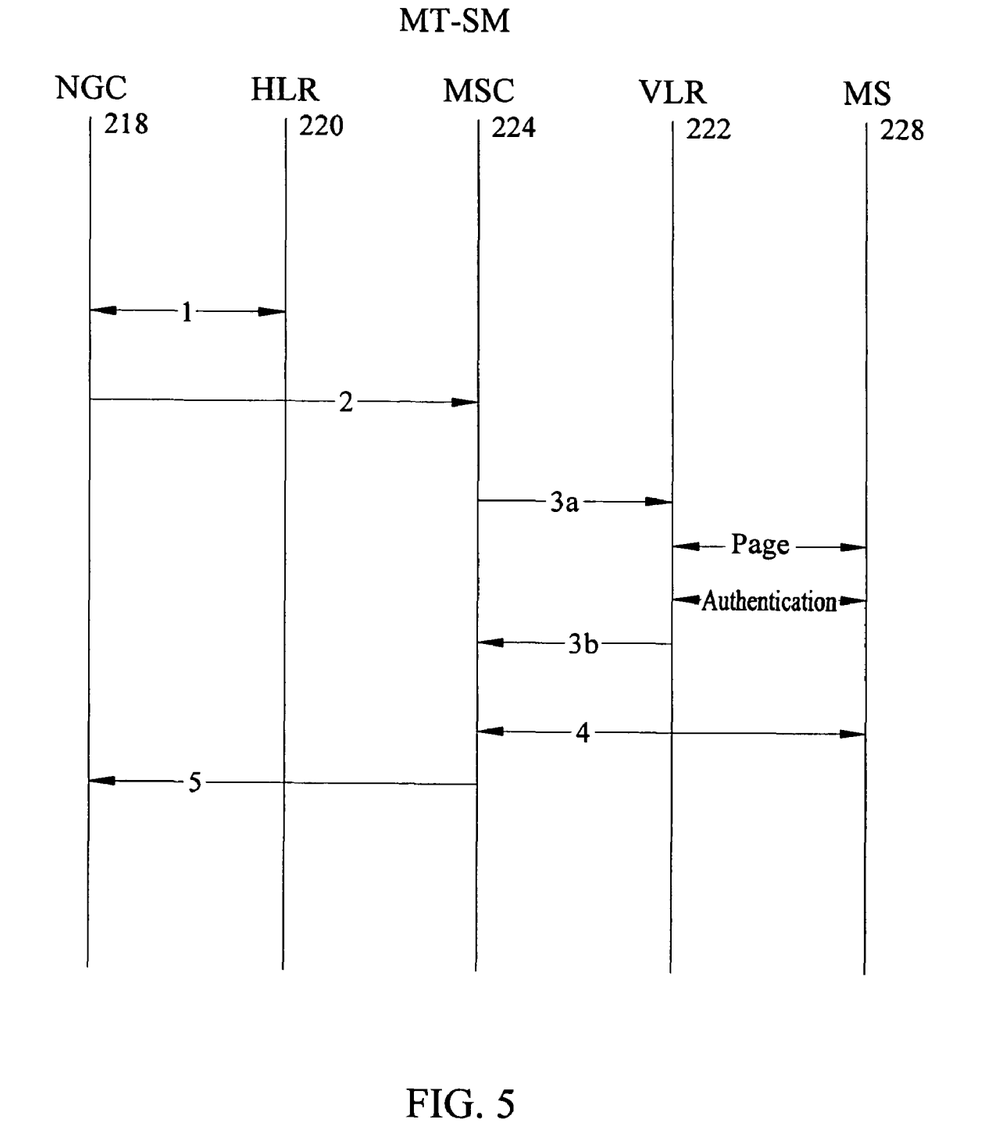
FIG. 5 is a call-flow diagram illustrating exemplary messages exchanged for transmitting a mobile-terminated short message from the network gateway controller to a mobile station according to an embodiment of the present invention.

FIG. 5 is a call-flow diagram for transmitting a mobile terminated short message from the network gateway controller to a mobile station. In step 1, the NGC 218 interrogates the HLR 220 and receives the routing information for the mobile subscriber by sending, for example, a sendRoutingInfoForShortMessage query. The NGC 218, acting as a SMSC, sends the short message to the MSC 224 using the forwardShortMessage operation. In step 3, the MSC 224 retrieves the subscriber information from the VLR 222, if necessary. This operation may include an authentication procedure. For example, in step 3A, a sendInfoForMT-SMS query is sent from the MSC 224 to the VLR 222. The VLR 222 may interrogate the mobile station to obtain authentication. Upon completion of the authentication process, the VLR 222 sends a sendInfoForMT-SMS acknowledge message to the MSC 224 (step 3B). In step 4, the MSC 224 transfers the short message to the mobile station. The MSC 224 reports the outcome of the forwardShortMessage operation to the SMSC. This confirmation message may be forwarded to the network gateway module 408 where the appropriate peg counts are updated. Various peg counts may be stored by the network gateway module 408 and may be used for billing and measurement purposes. For example, peg counts may be based on the number of messages that are successfully converted from SIP to SS7, the number of messages that failed conversion, the number of messages that were delivered successfully, and the number of messages that failed delivery. The network operator may use the peg counts to tally the transactions for billing at an offline database.

Figure 6:
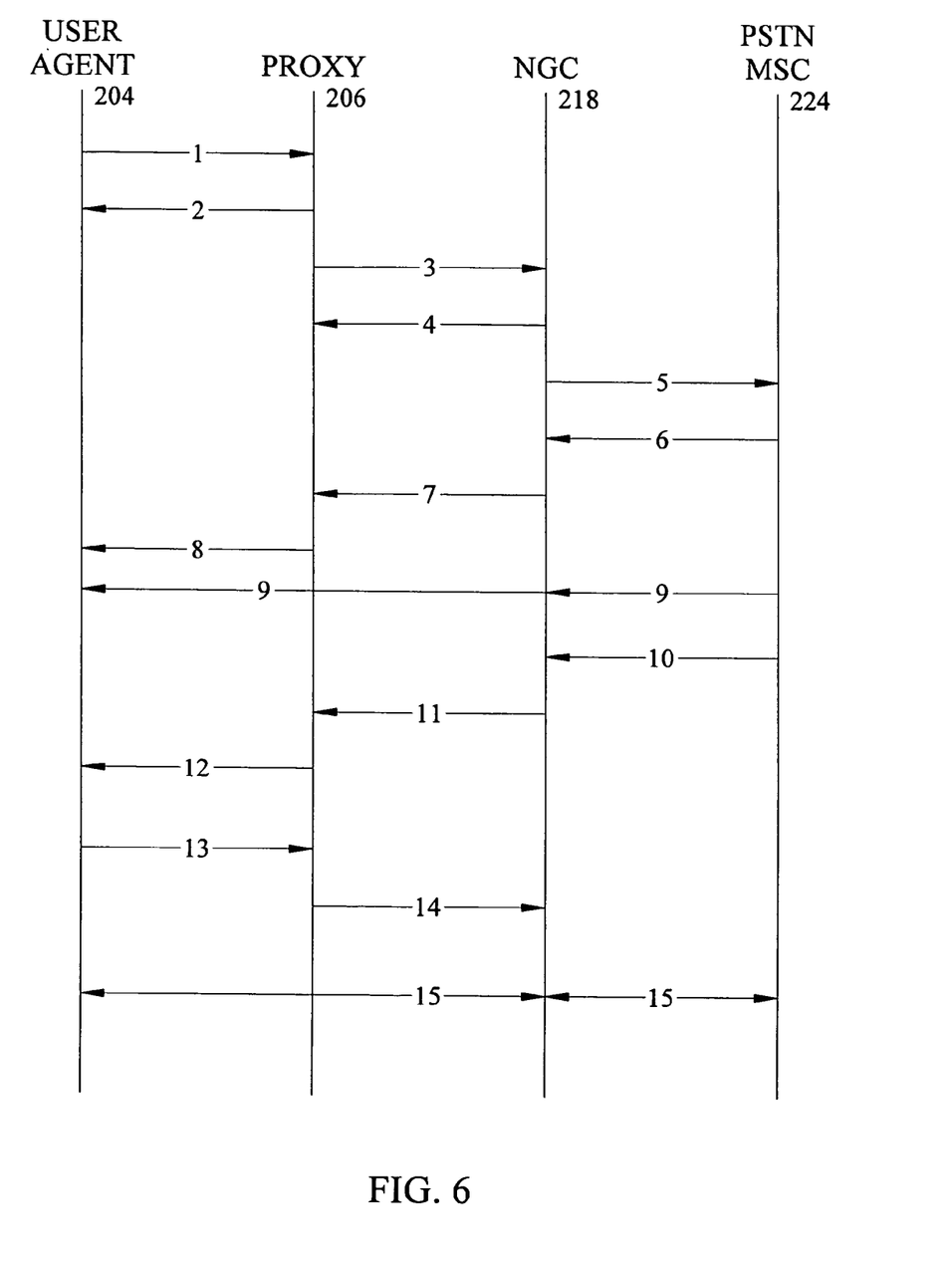
FIG. 6 is a call-flow diagram illustrating exemplary messages exchanged for a call originated by a SIP user agent to a user on the PSTN network according to an embodiment of the present invention.

FIG. 6 is an exemplary call-flow diagram for a call originated by a SIP user agent 204 to a user on the PSTN network. The messages sent from the user agent 204 to the NGC 218 use SIP, while messages sent from the NGC 218 to the PSTN 224 use the SS7 ISUP protocol. Thus, the NGC 218 is responsible for converting messages between SIP and ISUP. In step 1, the SIP user agent 204 initiates the call by sending an INVITE request toward the proxy server 206. The proxy server 206 returns a 100 Trying message to acknowledge the receipt of the INVITE request (step 2). In step 3, the proxy server 206 forwards the INVITE request to the NGC 218 for routing to the PSTN. In step 4, the NGC 218 acknowledges the receipt of the INVITE request by sending a 100 Trying message to the proxy server 206. The NGC 218 generates an SS7 IAM to the MSC 224 (step 5). In step 6, the MSC 224 returns an SS7 address complete message (ACM) to the NGC 218 to indicate that the call is progressing. In step 7, the NGC 218 sends a 183 (session progress) Session Description message to the proxy server 206 to indicate that the call is progressing, and the proxy server 206 forwards this message to the SIP user agent 204 (step 8). At this point, one-way audio is established from the PSTN network to the SIP user agent (step 9). In step 10, after the phone is answered, the MSC 224 sends back an SS7 answer message (ANM). In step 11, the NGC 218 sends a 200 OK Updated Session Description message to the proxy server, which forwards this message to the SIP user agent 204 (step 12). The SIP user agent 204 acknowledges the session description message (step 13) and the proxy server 206 forwards this acknowledgement to the MGC 224 (step 14). At this point, two-way voice communication between the SIP user agent 204 and the PSTN user has been established (step 15).

Thus, the present invention provides a system and method for converting an INVITE request MIME-encoded text into corresponding SS7 messages, thereby preserving the MIME-encoded text portion and establishing an end-to-end connection. More specifically, the INVITE request initiates an SS7 IAM message directed toward a user in the PSTN. The INVITE request is analyzed to determine if it contains MIME-encoded text and the parameters of the INVITE request are used to generate an SS7 SMS message that contains the MIME-encoded text, which is forwarded to the user in the PSTN network. Thus, a user in the PSTN network is able to receive the text portion of an INVITE request and also establish an end-to-end connection with the user in the SIP network.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method of converting a session initiation protocol (SIP) message to a signaling system 7 (SS7) message comprising:
   at a communications node:
   (a) receiving a SIP INVITE request;
   (b) determining whether the SIP INVITE request is destined for a PSTN subscriber;
   (c) in response to determining that the INVITE request is destined for a PSTN subscriber:
      (i) determining whether the INVITE request contains subscriber content, wherein the subscriber content stored in the SIP INVITE request includes multimedia content;
      (ii) in response to determining that the INVITE request contains subscriber content, constructing, using the INVITE request, a PSTN-compatible SS7 message service message containing the subscriber content and forwarding the message service message to the PSTN subscriber, wherein the PSTN-compatible SS7 message service message comprises either a short message service (SMS) message or a multimedia service (MMS) message;
      (iii) constructing, using the INVITE request, an initial address message (IAM); and
      (iv) routing the IAM to a switching office associated with the PSTN subscriber.

2. The method of claim 1 wherein determining whether the SIP INVITE request is destined for a PSTN subscriber includes consulting a routing table.

3. The method of claim 1 wherein determining whether the INVITE request contains subscriber content includes examining at least one of a content-length field, a content-type field, a content-disposition field, and a content field of the INVITE request.

4. The method of claim 1 wherein constructing the PSTN-compatible message service message includes:
   (a) determining whether the subscriber content is compatible with short messaging service (SMS);
   (b) in response to determining that the subscriber content is compatible with SMS, formatting the PSTN-compatible message service message as an SMS message;
   (c) in response to determining that the subscriber content is not compatible with SMS, formatting the PSTN-compatible message service message as a multimedia messaging service (MMS) message; and
   (d) mapping SIP parameters of the INVITE request to SS7 parameters of the PSTN-compatible message service message.

5. The method of claim 1 wherein routing the PSTN-compatible message service message to the PSTN subscriber includes determining SS7 routing parameters based on SIP message parameters.

6. The method of claim 1 wherein constructing the IAM message includes mapping SIP message parameters of the INVITE request to SS7 message parameters of the IAM message.

7. The method of claim 1 wherein routing the IAM message to the SS7 user includes determining SS7 routing parameters based on SIP message parameters.

8. A network gateway controller comprising:
   (a) a first interface module operatively coupled to an Internet protocol (IP) network and capable of receiving a session initiation protocol (SIP) message, wherein the SIP message is a SIP INVITE request including subscriber content, wherein the subscriber content stored in the SIP INVITE request includes multimedia content;
   (b) a first mapping process for extracting parameters from the SIP message and mapping the extracted parameters to generate corresponding signaling system 7 (SS7) message parameters and an SS7 initial address message (IAM) that includes the SS7 message parameters;
   (c) a second mapping process for extracting parameters from the SIP message and mapping the extracted parameters to generate corresponding PSTN-compatible SS7 message service message parameters, wherein the extracted parameters includes the subscriber content, wherein the PSTN-compatible SS7 message service message comprises either a short message service (SMS) message or a multimedia service (MMS) message; and
   (d) a second interface module operatively coupled to a network utilizing signaling system 7 (SS7), the second interface module capable of transmitting a message formatted in an SS7 protocol, forwarding the message service message towards the PSTN subscriber, and routing the IAM to a switching office associated with the PSTN subscriber.

9. The network gateway controller of claim 8 wherein the first interface module includes a SIP discrimination process capable of determining whether the SIP message is destined for a SIP user or a PSTN subscriber.

10. The network gateway controller of claim 8 wherein the first mapping process is adapted to generate corresponding ISDN User Part (ISUP) messages.

11. The network gateway controller of claim 8 wherein the first mapping process is adapted to generate corresponding Transaction Capabilities Application Part (TCAP) messages.

12. The network gateway controller of claim 8 wherein the second mapping process is adapted to determine whether the extracted parameters are compatible with short messaging service (SMS).

13. The network gateway controller of claim 12 wherein in response to determining that the extracted parameters are compatible with SMS, the second mapping process is adapted to formatting the PSTN-compatible message service message as an SMS message.

14. The network gateway controller of claim 12 wherein in response to determining that the extracted parameters are not compatible with SMS, the second mapping process is adapted to formatting the PSTN-compatible message service message as an multimedia messaging service (MMS) message.

15. The network gateway controller of claim 8 wherein the second mapping process is adapted to examine at least one of a content-length field, a content-type field, a content-disposition field, and a content field.

* * * * *